(12) United States Patent
Kochar et al.

(10) Patent No.: US 8,032,791 B2
(45) Date of Patent: Oct. 4, 2011

(54) DIAGNOSIS OF AND RESPONSE TO FAILURE AT RESET IN A DATA PROCESSING SYSTEM

(75) Inventors: Sumeet Kochar, Apex, NC (US); Barry A. Kritt, Raleigh, NC (US); William B. Schwartz, Apex, NC (US); Jeffrey B. Williams, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/499,070

(22) Filed: Jul. 7, 2009

(65) Prior Publication Data

US 2011/0010584 A1      Jan. 13, 2011

(51) Int. Cl.
*G06F 11/00*      (2006.01)
(52) U.S. Cl. ........................................ 714/36
(58) Field of Classification Search .................. 714/1–3, 714/4.1, 4.11, 4.12, 4.21, 4.3, 4.4, 5.11, 6.12, 714/10–13, 15, 16, 30, 31, 36, 37
See application file for complete search history.

(56) References Cited

U.S. PATENT DOCUMENTS

| | | | |
|---|---|---|---|
| 5,951,683 A * | 9/1999 | Yuuki et al. ........................ 713/1 |
| 6,134,680 A | 10/2000 | Yeomans | |
| 6,378,064 B1 * | 4/2002 | Edwards et al. ............... 712/227 |
| 6,449,739 B1 | 9/2002 | Landan | |
| 6,480,972 B1 | 11/2002 | Cromer et al. | |
| 6,601,183 B1 | 7/2003 | Larson et al. | |
| 6,934,873 B2 * | 8/2005 | Lu et al. ............................. 714/2 |
| 6,990,602 B1 | 1/2006 | Skinner et al. | |
| 7,058,826 B2 | 6/2006 | Fung | |
| 7,275,153 B2 * | 9/2007 | Kim .................................. 713/2 |
| 7,380,163 B2 | 5/2008 | Davies et al. | |
| 2001/0056554 A1 | 12/2001 | Chrabaszcz | |
| 2003/0163753 A1 * | 8/2003 | Lu et al. ............................. 714/2 |
| 2004/0078622 A1 | 4/2004 | Kaminsky et al. | |
| 2005/0273645 A1 | 12/2005 | Satran et al. | |
| 2008/0016387 A1 | 1/2008 | Bensinger | |
| 2009/0059937 A1 | 3/2009 | Kanada | |

FOREIGN PATENT DOCUMENTS

WO      9849620      11/1998

OTHER PUBLICATIONS

"Failover with ISV Cluster Management Software", IBM Informix Dynamic Server, Version 11.50, 1 page, retrieved Apr. 8, 2009 http://publib.boulder.ibm.com/infocenter/idshelp/v115/topic/com.
OpenSolaris Project: Cluster Agent: Informix Dynamic Server, pp. 1-2, retrieved Apr. 8, 2009 http://www.opensolaris.org/os/project/ha-informix/.

* cited by examiner

*Primary Examiner* — Nadeem Iqbal
(74) *Attorney, Agent, or Firm* — Yee & Associates, P.C.; Jason O. Piche

(57) ABSTRACT

Detection of a reset failure in a multinode data processing system is provided by a diagnostic circuit in each of a plurality of the server nodes of the system. Each diagnostic circuit is coupled to a code fetch chain of its corresponding node. At reset, prior to a node processor retrieving startup code from the code fetch chain, the diagnostic circuit provides diagnostic signals to the code fetch chain. A problem in the code fetch chain is detected from a response to the diagnostic signals. When a problem is detected, a node failure status for the problem node may be signaled to the other nodes. The multinode system may be configured in response to signaled node failure status, such as by dropping failed nodes and replacing a failed primary node with a secondary node if necessary.

20 Claims, 4 Drawing Sheets

DIAGNOSIS OF AND RESPONSE TO FAILURE AT RESET IN A DATA PROCESSING SYSTEM

BACKGROUND

1. Field

The disclosure relates generally to data processing systems and to diagnostic methods and systems therefore, and more specifically to multinode server systems and to diagnostic methods and systems for selecting a primary server and dropping failed servers from such a multinode system at system reset.

2. Description of the Related Art

In a multinode data processing system, a plurality of processor nodes are coupled together in a desired architecture to perform desired data processing functions during normal system operation under control of a multinode operating system. For example, such a multinode system may be implemented so as to distribute task processing in a desired manner across multiple processor nodes in the multinode system, thereby to implement parallel processing or some other desired processing scheme that takes advantage of the multinode environment.

Each server node in a multinode system may include one or more processors with associated hardware, firmware, and software to provide for necessary intra-node functionality. Such functionality includes a process for booting or starting up each server node from reset. This process may be used, for example, when power first is applied to the server nodes of the multinode system. As part of this process, a node processor begins to read and execute start-up code from a designated memory location. The first memory location the processor tries to execute is known as the reset vector. The reset vector typically is located in a startup memory region shadowed from a read only memory (ROM) device. The startup memory is coupled to the processor via one or more devices and connections that form a code fetch chain. For example, in a multinode data processing system, each node may include a central processing unit (CPU) that is coupled to a startup flash memory device via the code fetch chain. The start-up code includes basic input/output system (BIOS) code that is stored in the startup flash memory and retrieved by the CPU via the code fetch chain at system reset.

At some point during, or following, the reset procedure implemented in each node, the multinode environment itself is configured. This process may include confirming one of the server nodes preselected to perform the designated functions of a primary server node, dropping server nodes from the system that fail to boot properly, and reconfiguring the multinode system as necessary in response to the dropping of failed nodes, if any. This latter procedure may include selecting a new primary node from among the available secondary nodes, if the originally designated primary node fails to boot properly. It is, of course, desirable that the system reset process, from power on through system configuration to a fully configured and operable multinode system, be implemented efficiently, with a minimum of manual user intervention required.

In a conventional multinode boot flow from reset, at power up each server node independently begins fetching startup code from its startup memory, as discussed above. All of the server nodes boot up to a certain point in the start-up process. For example, all of the server nodes may boot up to a designated point in a pre-boot sequence power-on self-test (POST). Startup code on one of the server nodes, designated in advance by a user as the primary node, then merges all of the nodes to look like a system from there on and into a multinode operating system boot. If, during this reset process, a server node fails to boot properly to the required phase of the start-up, the failed server node would not be merged into the multinode system. The designated primary node simply would timeout waiting on the failed node to boot. If the node that fails to boot properly is the designated primary node, a user typically will have to work with a partition user interface and manually dedicate a new server as the primary node server.

In a more recently developed boot flow process, for new high end multinode systems, only one server node in the multinode system begins to fetch startup code at reset, and that node will be the primary node. This designated primary node will execute code and will configure all of the other nodes and present the multinode system as a single system to the multinode operating system. This new approach to the reset process in a multinode system presents several unique challenges, in addition to the known challenges associated with reset of a multinode data processing system in general.

It is desirable to detect server node failures as early in the reset process as possible. It is also desirable to drop off a failed primary node, and other failed nodes, from the multinode system as soon as possible. Furthermore, if a failed primary node is dropped, it is desirable as soon as possible to make a different server node in the multinode system, one that will boot properly, into the primary node. However, since, in the new reset approach described above, only one server node is executing startup code at reset, detecting node failure by detecting a failure to boot properly in the normal manner cannot be used as a diagnostic method for detecting and dropping off nodes from the multinode system other than the designated primary node. Furthermore, since the primary node is the only server node that is to be executing startup code, secondary node boot processes normally will have to be inhibited. For example, under such a reset scheme, baseboard management controllers (BMCs) in the code fetch chains of the secondary nodes may have to be instructed not to start automatic BIOS recovery (ABR) at reset. Also, it is desirable that any necessary repartitioning of the multinode system to select a new primary server node be accomplished with minimal or no manual user intervention.

BRIEF SUMMARY

A method and apparatus for detecting and responding to a failure at reset in a data processing system is disclosed. The method and apparatus will be described in detail with reference to the illustrative application thereof in a multinode data processing system. It should be understood, however, that the method or apparatus may also find application in a single node data processing system.

In accordance with an illustrative embodiment, a diagnostic circuit is provided in each of a plurality of server nodes in the multinode system. The diagnostic circuit is coupled to a corresponding code fetch chain in each server node. The code fetch chain couples a node processor to a node startup memory storing startup code for the server node.

At startup of the multinode system, prior to the node processor retrieving the startup code used to start up the server node from the node startup memory, the diagnostic circuit provides diagnostic signals to at least one point along the node code fetch chain. The diagnostic circuit detects any problem in the node code fetch chain from a received response of the code fetch chain to the diagnostic signals. When a problem in the node code fetch chain of any particular node is detected, the diagnostic circuit for that node may signal a failure status for that server node to the other server nodes in the multinode data processing system.

One of the server nodes in the multinode system is designated a primary node. If no problem is detected in the code fetch chain of the primary node, the primary node may proceed to partition the server nodes in the multinode system. To perform this partition, the primary node determines the failure status of the other server nodes. Server nodes signaling a failure status based on the diagnosis performed are dropped from the system.

At least one other of the server nodes in the multinode system is designated a secondary node. If no problem is detected in the code fetch chain of this secondary node, but a failure status is signaled for the primary node, the secondary node may take over as the primary node. In this case, the secondary node proceeds to partition the server nodes in the multinode system. To perform this partition the secondary node determines the failure status of the other server nodes. Server nodes signaling a failure status, including the originally designated primary node, are dropped from the system.

Further objects, features, and advantages will be apparent from the following detailed description and with reference to the accompanying drawings.

DETAILED DESCRIPTION

Figure 1:
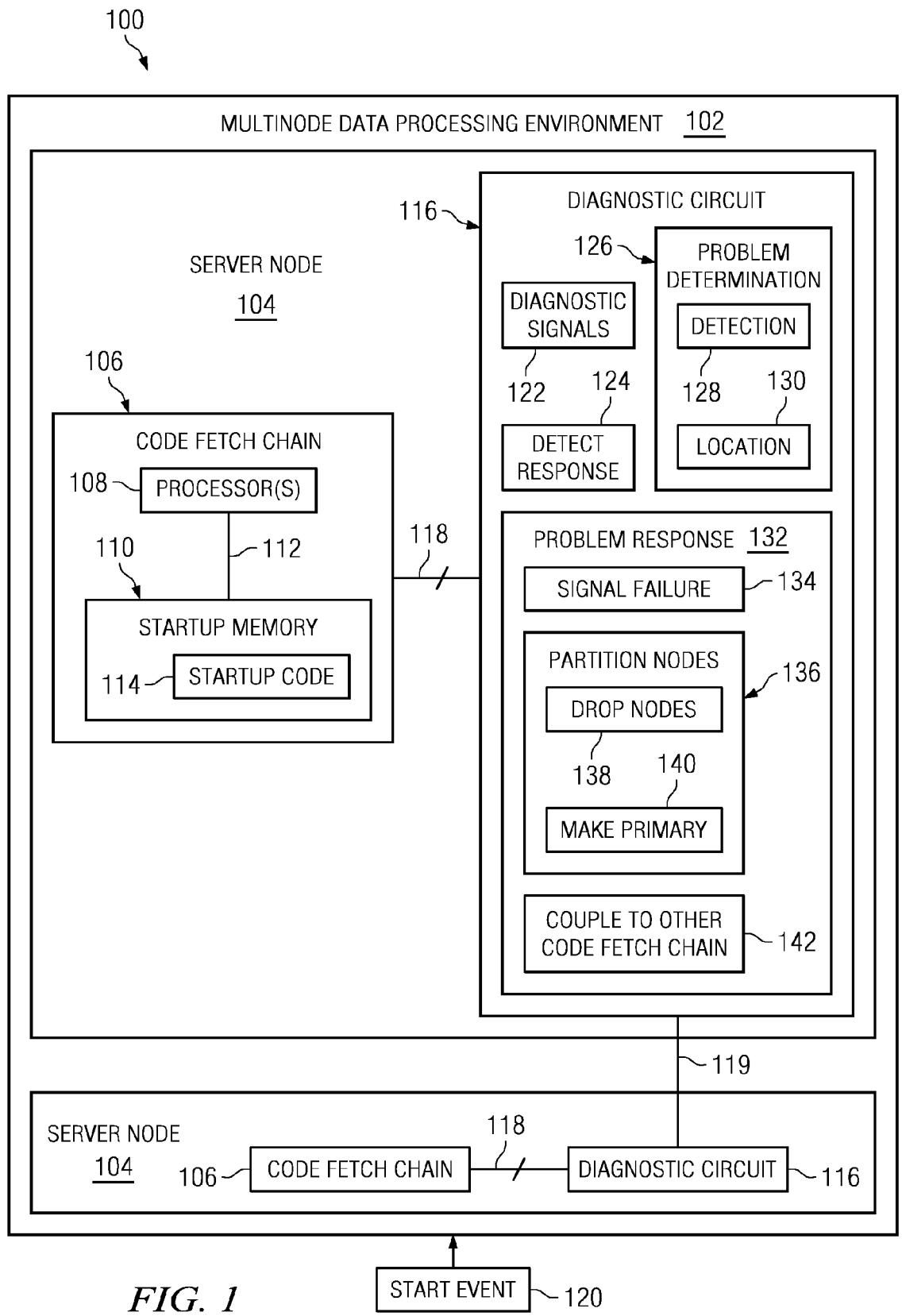
FIG. 1 is a functional block diagram of an illustrative system for diagnosing and responding to failure in a data processing system.

A method and apparatus for detecting failures at reset in a data processing system and for responding to such failures rapidly and without manual user intervention is disclosed. Functionality 100 of an exemplary system and method in accordance with an illustrative embodiment is presented in summary in the functional block diagram of FIG. 1. As discussed in more detail below, the system and method disclosed may be implemented in data processing environment 102, such as a multinode or single node data processing system. In a multinode system, the system and method may be implemented in one or more server nodes 104 of the multinode system. The disclosed system and method provide for the diagnosis of code fetch chain 106. Code fetch chain 106 includes one or more processors 108 coupled to startup memory 110 via one or more intermediary connections and/or devices 112. Startup memory 110 contains startup code 114, including a reset vector, which is retrieved by processor(s) 108 via code fetch chain 106 at start up of data processing system 102. Diagnostic circuit 116 is coupled to code fetch chain 106 at one or more points along code fetch chain 106 via one or more connections 118. In multinode data processing environment 102, diagnostic circuits 116 may be provided in each server node 104 and connected together via appropriate connections 119 to allow signal passing between nodes 104.

In response to event 120 to start data processing system 102, diagnostic circuit 116 provides diagnostic signals 122 via connections 118 to one or more points along code fetch chain 106. Diagnostic circuit 116 detects 124 a response of code fetch chain 106 to applied diagnostic signals 122. Based on detected response 124 of the code fetch chain 106, diagnostic circuit 116 determines 126 whether there are any problems in code fetch chain 106. Determination 126 may include detecting 128 whether or not a problem exists that would prevent startup of processor 108 and locating 130 the problem point on code fetch chain 106.

Diagnostic circuit 116 may provide appropriate response 132 to determination 126 of a problem in code fetch chain 106. Such response 132 may include signaling 134 a failure status via connection 119 to other diagnostic circuits 116 in other server nodes 104 in a multinode system. Response 132 may also include partitioning 136 nodes 104 in a multinode system in response to signaled 134 failure status of the various nodes. Such partitioning may include dropping 138 nodes 104 for which a failure status has been signaled 134 and making 140 a secondary node into a new primary node if failure status has been signaled 134 for a previously designated primary node. Response 132 to determination 126 of a problem in code fetch chain may include coupling 142 processor 108 to code fetch chain 106 of another server node 104 in a multinode system via diagnostic circuit 116 in the other node 104 and connection 119 between diagnostic circuits 116 in order effectively to bypass determined 126 problem in code fetch chain 106.

The illustration of data processing environment 102 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 2:
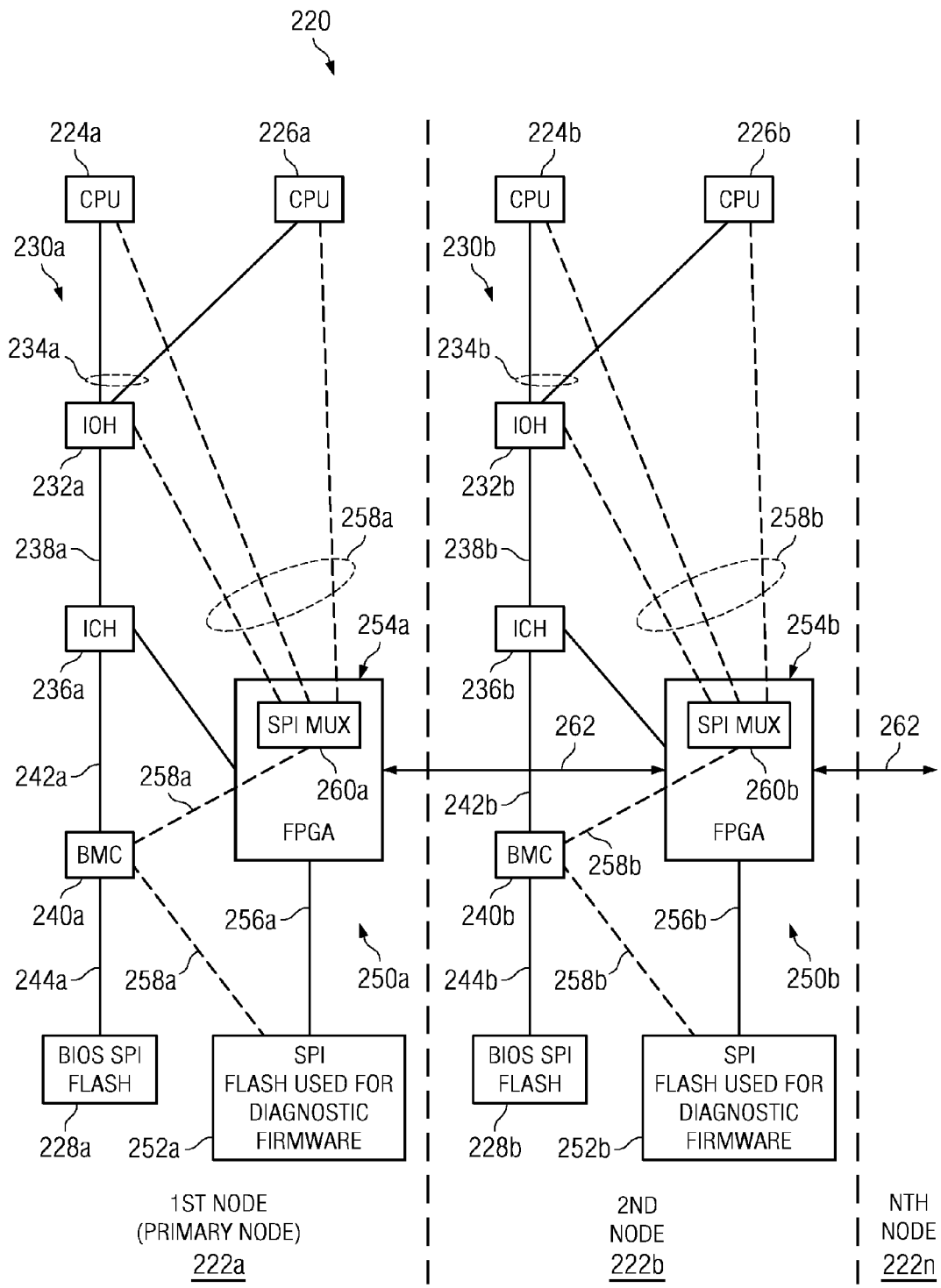
FIG. 2 is a block diagram of an exemplary multinode data processing system in which an illustrative embodiment is implemented.

An illustrative embodiment now will be described in detail with reference to application thereof in an exemplary multinode data processing system 220 as illustrated in FIG. 2. It should be understood, however, that the system and method to be described may also have application in data processing systems having a single node. In this example, multinode data processing system 220 is an example of one implementation of multinode data processing environment 102 in FIG. 1.

Multinode data processing system 220 includes server nodes 222a, 222b, . . . , 222n. One server node 222a is designated as the primary node prior to system start up. Other server nodes 222b . . . , 222n in the system are referred to in the present application as secondary nodes. Portions of only two exemplary server nodes 222a and 222b are illustrated in detail in FIG. 2. It should be understood, however, that the system and method being described may be implemented in a multinode data processing system having any number of a plurality of server nodes. The plurality of server nodes forming a multinode data processing system may have the same, similar, or different structures from the exemplary structures illustrated in FIG. 2, and to be described in detail below.

Each server node 222a and 222b includes one or more node processors, 224a, 226a, 224b, 226b. Processors 224a, 226a, 224b and 226b may be conventional central processing units (CPUs). Alternatively, processors 224a, 226a, 224b, and 226b may be or include any other type of digital processor currently known or which becomes known in the future. It should be understood that although each server node 222a and 222b illustrated in FIG. 2 is shown to include two node processors 224a, 226a and 224b, 226b, respectively, each server node 222a, 222b, . . . , 222n in multinode data processing system 220 may include a single processor or more than two processors and may include processors of different types in any desired combination.

Each server node 222a and 222b includes node startup memory 228a and 228b, respectively. Start up memory 228a and 228b is used to store startup code for the corresponding node processors 224a, 226a, 224b, 226b. Startup code is the first code that is read and executed by node processor 224a, 226a, 224b, 226b at system reset to begin the process of starting or booting server node 222a or 222b. For example, startup code may include basic input/output system (BIOS) code. Start up memory 228a, 228b may be implemented as flash memory or using some other similar memory device.

Typically, each processor 224a, 226a, 224b, 226b in server node 222a, 222b, is coupled to corresponding startup memory 228a, 228b by a series of intermediate devices and connections that form code fetch chain 230a, 230b, respectively. Thus, startup code is fetched by processors 224a, 226a, 224b, 226b from corresponding start up memory 228a, 228b along corresponding code fetch chain 230a, 230b. It should be noted that, in these illustrative examples, including in the appended claims, unless explicitly stated otherwise, the term "code fetch chain" is meant to include both the processor and startup memory at each end of the chain, as well as the devices and connections forming the chain between the processor and corresponding startup memory. Also, each processor within a server node in a multinode data processing system may have its own dedicated code fetch chain in the different illustrative examples. Alternatively, and more typically, each processor within a server node may share one or more code fetch chain components with one or more other processors within the same server node.

Exemplary code fetch chain components, devices, and connections, now will be described with reference to the exemplary data processing system 220 as illustrated in FIG. 2. It should be understood, however, that more, fewer, other and/or different components from those illustrated and described herein may be used to form a code fetch chain between a processor and startup memory in a multinode data processing system or other data processing system. Also, the particular selection of component devices and connections to form a code fetch chain will depend upon the particular application, and will be well known to those having skill in the art.

System processors 224a, 226a, 224b, 226b are the devices at a first end of code fetch chains 230a, 230b. Input/output (IO) hubs (IOH) 232a, 232b may be provided next in the chain. In the example provided herein, processors 224a, 226a and 224b, 226b in each server node 222a and 222b are connected to corresponding input/output hub 232a or 232b via appropriate connections 234a and 234b, respectively. Such connections 234a, 234b may include QuickPath Interconnect (QPI) connections. The QuickPath Interconnect is a point-to-point processor interconnect developed by Intel Corporation. Any other connection 234a, 234b appropriate for specific processor 224a, 226a, 224b, 226b, and input/output hub 232a, 232b components employed also may be used.

Next in code fetch chain 230a, 230b, input/output controller hubs (ICH) 236a, 236b, also known as the southbridge, may be provided. Southbridge 236a, 236b may be connected to corresponding input/output hub 232a, 232b in code fetch chain 230a, 230b via connections 238a, 238b. Such connections 238a, 238b may include the Enterprise Southbridge Interface (ESI). The ESI also is available from Intel Corporation. Any other connection 238a, 238b appropriate for specific input/output hub 232a, 232b components employed also may be used.

Baseboard management controllers (BMC) 240a, 240b are provided next in code fetch chains 230a, 230b. The baseboard management controller 240a, 240b may be connected to the corresponding input/output controller hub 236a, 236b via appropriate connection 242a, 242b. For example, such connection 242a, 242b may include a low pin count (LPC) bus connection. Any other connection 244a, 244b appropriate for the specific input/output controller hub 236a, 236b and baseboard management controller 240a, 240b components employed also may be used.

The final link in code fetch chain 230a, 230b, at the opposite end thereof from processors 224a, 226a, 224b, 226b, is startup memory 228a, 228b. Startup memory 228a, 228b may be connected to corresponding baseboard management controller 240a, 240b via an appropriate connection 244a, 244b. For example, such connection 244a, 244b may include a serial peripheral interface (SPI) connection 244a, 244b. Any other connection 244a, 244b appropriate for the specific baseboard management controller 240a, 240b and startup memory 228a, 228b components employed also may be used.

In these illustrative examples, including in the appended claims, the various devices and connections between devices that form a code fetch chain may be referred to as "points" along the code fetch chain. Thus, for exemplary primary server node 222a illustrated in FIG. 2, points along code fetch chain 230a include processor 224a, the connection 234a, the input/output hub 232a, connection 238a, input/output controller hub 236a, connection 242a, the baseboard management controller 240a, and startup memory 228a. Therefore, a connection to any point along exemplary code fetch chain 230a may include a connection to or at any device 224a, 232a, 236a, 240a, 228a or to or at any connection 234a, 238a, 242a, and 244a forming chain 230a.

An event to start data processing system 220 may include an initial power-on or reset operation that begins a startup procedure in each server node 222a, 222b, . . . 222n. Part of this startup procedure includes starting up one or more processors 224a, 226a, 224b, 226b in server nodes 222a, 222b, . . . 222n. At startup, one or more processors 224a, 226a, 224b, 226b begin to fetch start up code from corresponding startup memory 228a, 228b to begin processor operation. This procedure includes sending read requests down code fetch chain 230a, 230b from processors 224a, 226a, 224b, 226b to corresponding startup memory 228a, 228b, and the return of requested startup code back along code fetch chain 230a, 230b from startup memory 228a, 228b to corresponding processor 224a, 226a, 224b, 226b.

In a conventional startup procedure, for example, when a system processor is first powered on, the processor needs to start fetching startup code from startup memory to start executing. In a common startup scenario, the processor will start trying to access code by initially reading from the address pointed to by a reset vector. The reset vector is thus the first memory location that the processor tries to execute at start up. For example, if the reset vector for processor 224a is at the address 0FFFFFFF0, then processor 224a will attempt to start loading instructions from that address at start up. If exemplary server node 222a illustrated in FIG. 2 were implemented in a conventional manner, the first read request from processor 224a for the contents of exemplary reset vector address 0FFFFFFF0 would go down code fetch chain 230a. The read request would be sent over connector link 234a to input/output hub 232a that has hardware strapping to identify it as the designated firmware hub used at system startup.

Input/output hub 232a will decode the address, and will send the request down to southbridge device 236a across connection 238a. Southbridge device 236a will then attempt to read the requested data across connection 242a using the lower address bits to address the desired location within startup memory. Startup memory could be implemented in an older technology LPC flash chip, in which case LPC bus 242a is connected directly to startup memory. Alternatively, as illustrated in FIG. 2, startup memory may be implemented as an SPI flash device 228a, in which case connection 242a is coupled to baseboard management controller 240a that provides an interface to startup memory 228a.

It should be apparent that a problem in any component of code fetch chain 230a, 230b that prevents a read request from being sent down chain 230a, 230b from processor 224a, 226a, 224b, 226b to startup memory 228a, 228b, or that prevents the startup code from being retrieved from startup memory 228a, 228b by processor 224a, 226a, 224b, 226b, will cause the processor to fail to start properly. In the context of a multinode data processing system, such a boot failure of a processor in server nodes 222a, 222b, ..., 222n may mean that the node itself will fail to boot properly, and thus must be dropped from the multinode system configuration. If the failed node is initially designated primary node 222a, multinode system 220 must be configured with one secondary node 222b, ..., 222n, one which will boot properly, becoming the primary node in place of failed primary node 222a.

Diagnostic circuits 250a, 250b may be provided in each server node 222a, 222b, ..., 222n of multinode data processing system 220. As will be described in more detail below, such diagnostic circuits 250a, 250b may be used to perform a diagnostic procedure on code fetch chains 230a, 230b of server nodes 222a, 222b, ..., 222n prior to server node processors 224a, 226a, 224b, 226b attempting to retrieve startup code from startup memory 228a, 228b along code fetch chains 230a, 230b. Thus, diagnostic circuit 250a, 250b may be used to detect problems in code fetch chain 230a, 230b, that will cause server nodes 222a, 222b, ..., 222n to fail to start properly. In this way failed nodes 222a, 222b, ..., 222n may be identified early in the system startup process, and multinode system 220 configured as soon as possible to drop failed nodes and replace failed primary node 222a, if necessary.

According to the illustrative embodiment of FIG. 2, the functionality of diagnostic circuit 250a, 250b, as will be described in more detail below, may be implemented in diagnostic firmware that is provided in each server node 222a, 222b, ..., 222n of multinode data processing system 220. For example, diagnostic circuit 250a, 250b may be implemented using diagnostic flash memory 252a, 252b, for example SPI flash memory used for diagnostic firmware, and field programmable gate array (FPGA) 254a, 254b provided in each node 222a, 222b, ..., 222n. Diagnostic flash memory 252a, 252b, may be coupled to FPGA 254a, 254b via an appropriate interface, such as SPI interface 256a, 256b.

Diagnostic circuit 250a, 250b in each node 222a, 222b, ..., 222n is coupled to at least one point, and preferably to a plurality of points, along code fetch chain 230a, 230b that connects node processors 224a, 226a, 224b, 226b to corresponding startup memory 228a, 228b. For the illustrative embodiment of FIG. 2, diagnostic circuit 250a, 250b may be coupled to code fetch chain 230a, 230b at processors 224a, 226a, 224b, 226b, at input/output bridge or input/output hub (IOH) 232a, 232b, at input/output controller hub (ICH) or southbridge chip 236a, 236b, at connection 242a, 242b leading from the input/output controller hub 236a, 236b to the baseboard management controller 240a, 240b, and at the startup flash memory 228a, 228b via the baseboard management controller 240a, 240b. It should be understood that diagnostic circuit 250a, 250b may be connected to corresponding code fetch chain 230a, 230b at more, fewer, and/or different points thereon from those illustrated by example in FIG. 2.

Various connections 258a, 258b that couple diagnostic circuit 250a, 250b, to corresponding code fetch chain 230a, 230b may be implemented in any appropriate manner via an appropriate interface. As discussed above, diagnostic circuit 250a, 250b may be implemented using flash parts. The latest generation flash parts are known in the industry as SPI (Serial Peripheral Interface) flash parts. The data on these devices are read using a serial connection, and therefore require just a few pin connections to access their data. Many devices that are or will be used to implement code fetch chain 230a, 230b now have the ability to read data in using this SPI data interface. For example, some Intel Corporation processors, input/output hubs, southbridges, and Vitesse baseboard management controllers have SPI interfaces. Thus, such serial peripheral interfaces (SPIs) are an appropriate exemplary choice for implementing connections 258a, 258b between diagnostic circuit 250a, 250b and various points on code fetch chain 230a, 230b.

In operation, diagnostic circuit 250a, 250b may be used to present diagnostic signals at different points on code fetch chain 230a, 230b via various connections 258a, 258b. Depending upon the configuration of diagnostic circuit 250a, 250b, the configuration of code fetch chain 230a, 230b, and the particular points on code fetch chain 230a, 230b to which diagnostic signals are to be provided, connections 258a, 258b between code fetch chain 230a, 230b and diagnostic circuit 250a, 250b may be made at various appropriate points, and by various appropriate connections, at diagnostic circuit 250a, 250b. For example, to present diagnostic signals to baseboard management controller 240a, 240b that correspond to code that would be retrieved along the interface 244a, 244b between startup code flash memory 228a, 228b and baseboard management controller 240a, 240b, diagnostic flash memory 252a, 252b of diagnostic circuit 250a, 250b may be coupled directly to baseboard management controller 240a, 240b at the appropriate inputs thereof via an interface 258a, 258b. Other interfaces 258a, 258b to various other points on the code fetch chain 230a, 230b may be provided via multiplexer 260a, 260b. Multiplexer 260a, 260b may be implemented as part of, or as a separate device apart from but coupled to and controlled by, diagnostic circuit field programmable gate array 254a, 254b.

Various diagnostic circuits 250a, 250b in a multinode data processing system preferably also are connected to each other such that signals may be passed among various server nodes 222a, 222b, ..., 222n of system 220 via diagnostic circuits 250a, 250b. Diagnostic circuits 250a, 250b may be connected together in any appropriate manner and in any appropriate configuration, depending upon how diagnostic circuits 250a, 250b themselves are configured and implemented. Preferably, diagnostic circuits 250a, 250b in various server nodes 222a, 222b, ..., 222n are connected together such that a communication signal from any one of a plurality of diagnostic circuits 250a, 250b in one server node 222a, 222b, ..., 222n of multinode data processing system 220 may be sent to, and received by, all other diagnostic circuits 250a, 250b in various other server nodes 222a, 222b, ..., 222n of system 220. For example, various diagnostic circuits 250a, 250b in various server nodes 222a, 222b, ..., 222n may be coupled together for communication therebetween using appropriate connections 262. For example, connections 262 between diagnostic circuits 250a, 250b may be implemented using QPI scalability cables. Appropriate scalability cables of this type may be obtained from International Business Machines Corporation. Any other connection 262 appropriate for specific diagnostic circuit 250a, 250b implementation also may be used.

Many devices provide hardware strapping pins to control their operations. Such devices include devices in code fetch chain 230a, 230b that control booting and the initial code fetch by processors 224a, 226a, 224b, 226b. For example, for exemplary server nodes 222a, 222b, . . . , 222n illustrated in FIG. 2, processor 224a, 226a, 224b, 226b may be hardware strapped either to send initial read requests for startup code down link 234a, 234b, or to get the data from its own SPI interface. Input/output hub 232a, 232b can be strapped to be the "firmware hub" and respond to the address range of the reset vector and BIOS code. Likewise, input/output hub 232a, 232b can be hardware strapped either to send a read request from processor 224a, 226a, 224b, 226b down link 238a, 238b, or to get the data from its own SPI interface. Input/output controller hub 236a, 236b also may be strapped either to get the required data from connection 242a, 242b or from its SPI interface. Baseboard management controller 240a, 240b also may be strapped either to get the data from interface 244a, 244b or from a secondary SPI interface. Typically the strapping is hardwired depending on the application, and where SPI flash device 228a, 228b is physically located.

By including among connections 258a, 258b between diagnostic circuit 250a, 250b and code fetch chain 230a, 230b appropriate connections to the hardware strapping pins of the various devices in code fetch chain 230a, 230b, diagnostic circuit 250a, 250b is able to change dynamically the device strapping by connecting the SPI interfaces of various devices in code fetch chain 230a, 230b to diagnostic circuit 250a, 250b. Thus, the various devices in code fetch chain 230a, 230b can be strapped to receive data from and send data to diagnostic circuit 250a, 250b, via interfaces 258a, 258b, in place of the normal connections to neighboring devices in code fetch chain 230a, 230b. As part of a diagnostic method, to be described in more detail below, diagnostic circuit 250a, 250b is able to change dynamically the data that is presented on the various interfaces 258a, 258b to code fetch chain 230a, 230b at system reset. Such data may include various diagnostic signals. For example, diagnostic circuit 250a, 250b may be implemented to simulate multiple input and output SPI interfaces 258a, 258b. As part of a diagnostic routine, diagnostic circuit 250a, 250b may simulate an SPI flash connection to processor 224a, 226a, 224b, 226b, input/output hub 232a, 232b, southbridge 236a, 236b, and baseboard management controller 240a, 240b. Diagnostic circuit 250a, 250b also may be implemented to simulate an SPI interface to multiple SPI flash devices, such as a flash device with BIOS code and secondary flash device 252a, 252b with diagnostic code. Diagnostic circuit field programmable gate array 254a, 254b can read in the data from either flash device 252a, 252b, and can "present" the data to any of the devices in code fetch chain 230a, 230b wanting data, as if the device was reading the data directly from flash part 252a, 252b. Since diagnostic circuits 250a, 250b in various nodes 222a, 222b, . . . , 222n are coupled together by appropriate connections 262, diagnostic circuit 250a, 250b also may be implemented to change dynamically the code fetch chain device strapping to alter the path to the startup code (including the reset vector address and first instruction fetches) on a given node or across nodes in a multinode configuration. These strapping options may be controlled by diagnostic circuit 250a, 250b based on various factors, such as detecting a problem in code fetch chain 230a, 230b of server node 222a, 222b, . . . , 222n. As discussed in more detail below, by changing the strapping across nodes in multinode system 220, server node 222a, 222b, . . . , 222n having a detected problem in code fetch chain 230a, 230b may be made to boot successfully by strapping to a code fetch chain 230a, 230b of another server node 222a, 222b, . . . , 222n.

Diagnostic circuit 250a, 250b, connections 258a, 258b between diagnostic circuit 250a, 250b and code fetch chain 230a, 230b, and connections 262 among diagnostic circuits 250a, 250b, may be implemented using any appropriate hardware and/or configuration thereof, either currently known or which becomes known to those skilled in the art, that may be operated to implement the functions as described and claimed herein. Such hardware may be added to or provided in a data processing system for the specific purpose of implementation. Alternatively, some or all of the hardware components necessary or desired for implementation may already be in place in a data processing system, in which case such hardware structures only need to be modified and operated as necessary for implementation. For example, some existing multinode data processing systems include a field programmable gate array in the chip set that has its own power supply and that is used to provide low level operations at start up. Such an already in place component may be modified as necessary and operated in such a manner so as to implement one or more functions of diagnostic circuit 250a, 250b.

Figure 3:
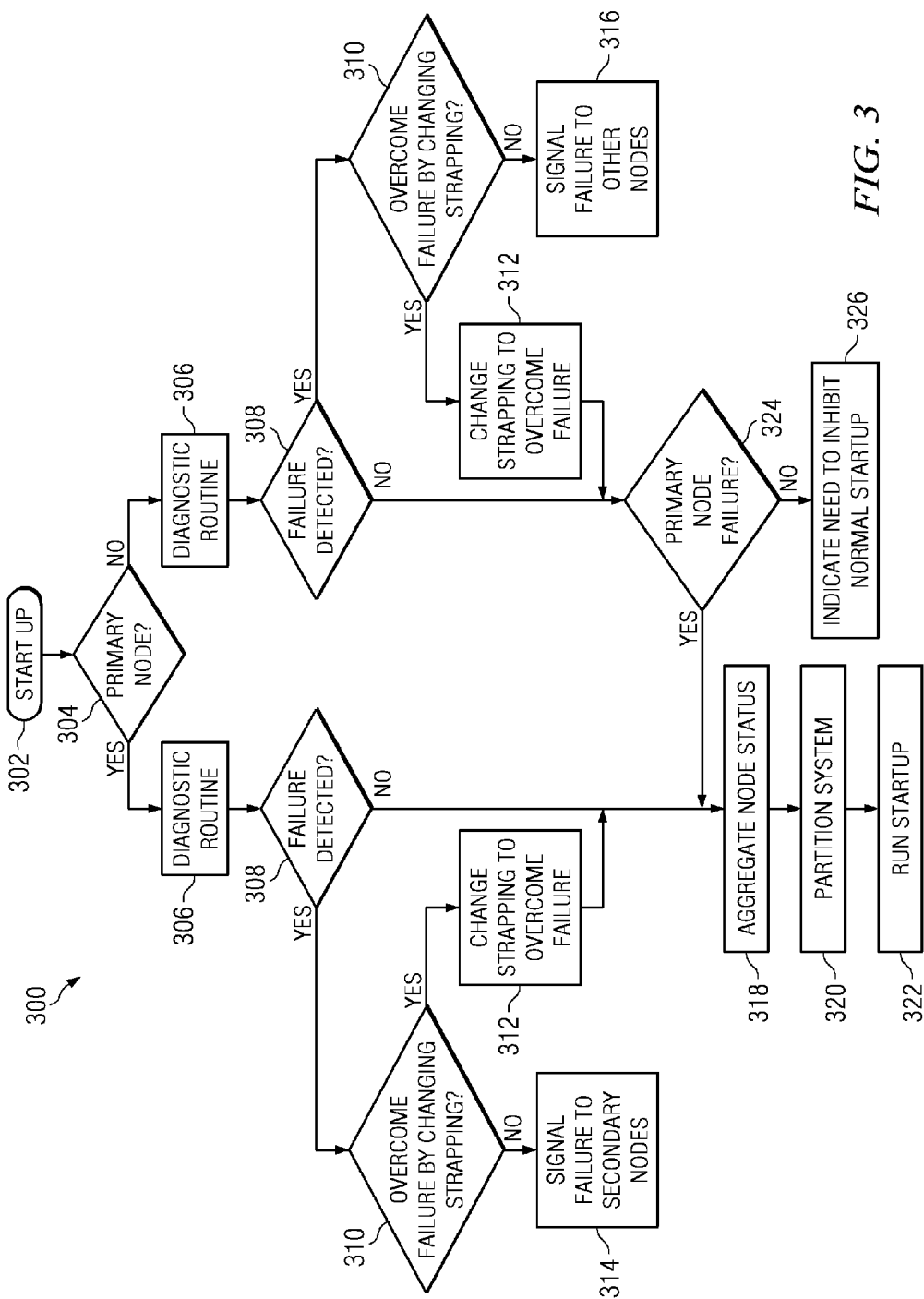
FIG. 3 is a flow chart of an illustrative method for diagnosing and responding to server node failure at reset of a multinode data processing system.

An illustrative method 300 for diagnosing and responding to server node failure at reset of a multinode data processing system now will be described in more detail with reference to the flow chart diagram of FIG. 3. The illustrative method 300 may be implemented for operation in one or more diagnostic circuits 250a, 250b as described above.

Illustrative method 300 begins at startup (step 302) responsive to an event to start data processing system 220. For example, such an event may be the initial turn on of power to system 220, or a reset of system 220 or a part thereof. Preferably, method 300 is executed to detect problems in code fetch chain 230a, 230b, before processor 224a, 226a, 224b, 226b attempts to retrieve startup code via code fetch chain 230a, 230b under diagnosis. Thus, diagnostic firmware preferably may be executed before server node processors 224a, 226a, 224b, 226b are allowed to run actual startup code, and may thus be used to test the code fetch or other input/output paths for any problems.

Operation of method 300 may be different depending upon whether method 300 is operating in primary node 222a or secondary node 222b, . . . , 222n of multinode data processing system 220, as well as on the preferred startup procedure for various server nodes 222a, 222b, . . . , 222n of data processing system 220. Thus, an initial determination is made (step 304) to determine whether the method is to follow the process to be used for primary node 222a or for secondary node 222b, . . . , 222n. Step 304 may be implemented in the firmware of diagnostic circuit 250a, 250b. Firmware in diagnostic circuit 250a of pre-designated primary node 222a may be implemented to begin automatically to follow the primary node process to be described, responsive to an event to start data processing system 220. Similarly, firmware in diagnostic circuit 250b of secondary node 222b of multinode data processing system 220 may be implemented to begin automatically to follow the secondary node process to be described, responsive to an event to start data processing system 220.

Figure 4:
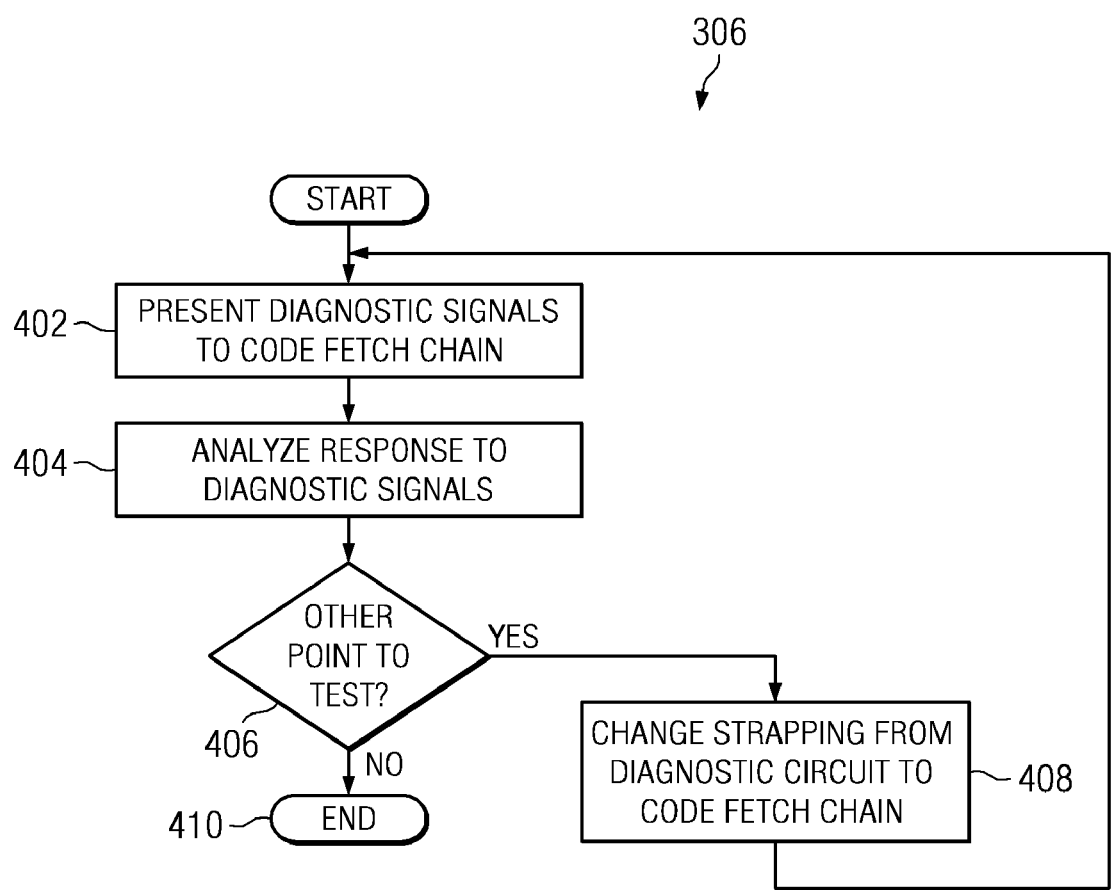
FIG. 4 is a flow chart illustrating in more detail an illustrative diagnostic method.

Following step 304, a diagnostic routine (step 306) to determine if there are any problems in code fetch chain 230a, 230b is initiated. An illustrative diagnostic routine now will be described in detail with reference to FIG. 4.

The diagnostic routine begins by providing diagnostic signals to a point on code fetch chain 230a, 230b (step 402). As described above, such diagnostic signals may be provided to a desired point on code fetch chain 230a, 230b via one or more connections 258a, 258b between diagnostic circuit 250a, 250b and code fetch chain 230a, 230b. Diagnostic signals provided to code fetch chain 230a, 230b preferably are selected so as to elicit a response, at the applied or another point on code fetch chain 230a, 230b, that will indicate whether or not there is a problem in code fetch chain 230a, 230b that would prevent corresponding processor 224a, 226a, 224b, 226b from retrieving successfully its startup code. The exact nature of the diagnostic signals to be provided to code fetch chain 230a, 230b will depend, of course, on the specific implementation of code fetch chain 230a, 230b being diagnosed as well as the particular point along code fetch chain 230a, 230b to which diagnostic signals are to be provided. For example, the diagnostic signals may include startup code.

The response of code fetch chain 230a, 230b to the diagnostic signals presented is analyzed (step 404) to detect any problem in code fetch chain 230a, 230b. For example, the response of code fetch chain 230a, 230b may be detected as response signals received back from code fetch chain 230a, 230b by diagnostic circuit 250a, 250b via one or more of various connections 258a, 258b between diagnostic circuit 250a, 250b and code fetch chain 230a, 230b. These response signals may be analyzed by diagnostic circuit 250a, 250b to determine whether or not a problem in code fetch chain 230a, 230b is indicated. The response signals also may be analyzed by diagnostic circuit 250a, 250b to determine the nature of the problem detected and/or whether diagnostic signals should be provided to other points along code fetch chain 230a, 230b.

A determination may thus be made to determine whether or not diagnostic signals should be provided at other points along code fetch chain 230a, 230b (step 406). If such further testing is to be conducted, diagnostic circuit 250a, 250b may change the strapping from diagnostic circuit 250a, 250b (step 408) so that diagnostic signals now may be provided (step 402) from diagnostic circuit 250a, 250b at a different point along code fetch chain 230a, 230b via different connections 258a, 258b. Similarly, different response signals may now be looked for on different connections 258a, 258b from a different point or points in code fetch chain 230a, 230b in response to such diagnostic signals. When it is determined (step 406) that there are no more points along code fetch chain 230a, 230b to which diagnostic signals are to be applied, diagnostic routine 306 may end (step 410).

In an illustrative embodiment, diagnostic signals are presented first to processor 224a, 226a, 224b, 226b at one end of code fetch chain 230a, 230b. This may be accomplished by changing the processor strapping such that at startup processor 224a, 226a, 224b, 226b, is provided with desired diagnostic signals from diagnostic circuit 250a, 250b in place of the normal contents of the reset vector in the startup code. Diagnostic signals may then be provided in sequence to various points along code fetch chain 230a, 230b, starting at processor 224a, 226a, 224b, 226b, and moving down chain 230a, 230b toward startup memory 228a, 228b. Alternatively, diagnostic signals may be provided to various points along code fetch chain 230a, 230b in any other desired order or sequence. By providing diagnostic signals to a plurality of points along code fetch chain in a desired sequence any problem in code fetch chain 230a, 230b may be detected and the location of the problem in code fetch chain 230a, 230b determined.

For example, if diagnostic circuit 250a, 250b detects a problem in code fetch chain 230a, 230b such that processor 224a, 226a, 224b, 226b is not able to boot successfully, it may read in selected contents from diagnostic flash part 252a, 252b across interface 256a, 256b and change the strapping of various devices in code fetch chain 230a, 230b to control where the boot code is read from. Diagnostic circuit 250a, 250b may then present diagnostic flash image signals at the interface of different devices in code fetch chain 230a, 230b in a desired sequence to diagnose the problem in more detail. For example, diagnostic circuit 250a, 250b may change the strapping such that a diagnostic signal in the form of startup code is presented at the SPI interface of processor 224a, 226a, 224b, 226b. If processor 224a, 226a, 224b, 226b is then able to boot, the problem is with something down the code fetch chain path to input/output hub 232a, 232b, southbridge 236a, 236b, baseboard management controller 240a, 240b, or startup flash memory 228a, 228b. Diagnostic circuit 250a, 250b may then change the strapping such that a diagnostic signal in the form of startup code is presented at the SPI interface of input/output hub 232a, 232b. If processor 224a, 226a, 224b, 226b is then able to boot, the problem is with something further down code fetch chain 230a, 230b, below input/output hub 232a, 232b. Diagnostic circuit 250a, 250b may continue to change the strapping to change where the diagnostic signals are presented along code fetch chain 230a, 230b to allow the problem to be isolated.

Returning now to FIG. 3. It is next determined whether or not step 306 determined that a problem exists in code fetch chain 230a, 230b of server node 222a, 222b, . . . 222n that would prevent the node from booting properly (step 308). If a problem in node code fetch chain 230a, 230b is detected, it may still be possible to boot the node by changing the strapping to node processor 224a, 226a, 224b, 226b via one or more diagnostic circuits 250a, 250b to provide the required startup code to processor 224a, 226a, 224b, 226b. Thus, it is determined, based on the results of step 306, which may have isolated the location of any detected problem in code fetch chain 230a, 230b, whether or not a detected problem can be overcome by changing the strapping to node processor 224a, 226a, 224b, 226b via diagnostic circuit 250a, 250b such that startup code may be provide to processor 224a, 226a, 224b, 226b via a route that avoids the problem, so that processor 224a, 226a, 224b, 226b may boot properly (step 310).

If it is determined at step 310 that a detected failure may be overcome by changing the node strapping, the strapping changes required to provide startup code to processor 224a, 226a, 224b, 226b, thereby to allow a server node to boot properly, may be implemented (step 312). Changing the strapping in this manner may involve the participation of one or more diagnostic circuits 250a, 250b in various nodes 222a, 222b, . . . , 222n of multinode system 220. For example, multiple diagnostic circuits 250a, 250b may be used to change the strapping to processor 224a, 226a, 224b, 226b, such that processor 224a, 226a, 224b, 226b in one server node 222a, 222b, . . . , 222n is able to retrieve startup code from another node 222a, 222b, . . . , 222n, using code fetch chain 230a, 230b of another server node 222a, 222b, . . . , 222n, via connection 262 between diagnostic circuits 250a, 250b.

Thus, improved availability is provided. If diagnostic circuit 250a, 250b detects that node 222a, 222b, . . . , 222n is not able to boot successfully, it may reconfigure the node configuration such that it will use startup firmware 228a, 228b from a different node 222a, 222b, . . . , 222n by changing which input/output hub 232a, 232b is the "firmware hub" and other related strapping. This will allow node 222a, 222b, ..., 222n to boot even in cases where there are problems which would have prevented the original system configuration from booting.

If it is determined at step 310 that a detected failure in code fetch chain 230a, 230b of node 222a, 222b, ..., 222n cannot be overcome by changing node strapping, failure of node 222a, 222b, ..., 222n preferably is signaled to other nodes 222a, 222b, ..., 222n in system 220, so that an appropriate response to the failure may be taken. Thus, a failure of originally designated primary node 222a preferably results in signaling a failure status for primary node 222a to other nodes 222b, ..., 222n in system 220 (step 314). Similarly, a failure of secondary node 222b, ..., 222n preferably results in signaling a failure status for that node to all other nodes 222a, 222b, ..., 222n (step 316), including to primary node 222. This signaling of failure status may be provided between nodes 222a, 222b, ..., 222n by diagnostic circuits 250a, 250b via connections 262 between diagnostic circuits 250a, 250b of various nodes 222a, 222b, ..., 222n in multinode system 220.

If it is determined at step 308 that a failure in code fetch chain 230a of primary node 222a has not been detected, or the detected failure in code fetch chain 230a has been overcome by changing the strapping at step 312, primary node 222a should boot properly. In such case diagnostic circuit 250a in primary node 222a, which will receive any node failure status signals from secondary nodes 222b, ..., 222n, may aggregate the node failure status of nodes 222a, 222b, ..., 222n in system 220 (step 318). Based on the aggregated node failure status of all nodes 222a, 222b, ..., 222n in system 220, diagnostic circuit 250a of primary node 222a preferably may partition multinode system 220 (at step 320). As part of this partitioning, any secondary nodes 222b, ..., 222n for which a node failure status has been indicated will be dropped from the multinode system. Diagnostic circuit 250a in primary node 222a may aggregate node failure status from each node 222a, 222b, ..., 222n and may rewrite the new partition descriptor in a location readable via system management software. The user may then view the updated partition information via an appropriate user interface. The partitioning itself, however, may be performed by diagnostic circuit 250a without the need for any manual intervention. After partitioning the system, primary node 222a may be allowed to begin running startup code in a normal manner (step 322).

For secondary nodes 222b, ..., 222n, if it is determined at step 308 that a failure in code fetch chain 230b of secondary node 222b, ..., 222n has not been detected, or the detected failure in code fetch chain 230b has been overcome by changing the strapping at step 312, secondary node 222b, ..., 222n should boot properly. In such case, diagnostic circuit 250b in secondary node 222b may determine whether a node failure status signal has been received by diagnostic circuit 250b from primary node 222a (step 324). If it is determined that a node failure status for primary node 222a has been indicated, diagnostic circuit 250b in secondary node 222b, which will receive any node failure status signals from other nodes 222a, 222b, ..., 222n, including from primary node 222a, may aggregate the node failure status of nodes 222a, 222b, ..., 222n in the system (step 318). Based on the aggregated node failure status of all nodes 222a, 222b, ..., 222n in system 220, diagnostic circuit 250b of secondary node 222b preferably may partition the multinode system 220 (step 320). As part of this partitioning, failed primary node 222a and any secondary nodes 222b, ..., 222n for which a node failure status has been indicated will be dropped from multinode system 220, and secondary node 222b will be designated as the new primary node, to take the place of failed primary node 222a. After partitioning the system, secondary node 222b may be allowed to begin running the startup code in a normal manner (step 322).

Thus, based on the diagnosis performed by diagnostic circuits 250a, 250b, and the resulting visibility of diagnostic circuits 250a, 250b to fatal system errors, a primary node may be selected and/or failed nodes may be dropped off from multinode system 220 seamlessly, without any user intervention. If primary node diagnostic circuit 250a detects a problem that can result in failure of primary node 220a to boot properly, it may use the failure status signal to signal to diagnostic circuit 250b in secondary node 222b to change the hardware straps to make a different node primary node. Diagnostic circuit 250b in secondary node 222b has visibility to all failure status signals from all nodes 222a, 222b, ..., 222n in the system, and can use that information to drop off failed nodes from system 220.

As mentioned above, in certain boot flow processes for high end multinode systems only the primary node begins to fetch startup code at reset. In such a system, in response to a determination by diagnostic circuit 250b of secondary node 222b, ..., 222n that no failure status signal from primary node 222a has been received (step 324), a need to inhibit normal startup in secondary node 222b, ..., 222n may be indicated (step 326). For example, in such a case where only primary node 222a is to startup in the normal manner, and no failure of designated primary node 222a is indicated, diagnostic circuit 250b of secondary node 222b, ..., 222n may indicate to baseboard management controller 240b in code fetch chain 230b of secondary node 222b, ..., 222n not to start automatic BIOS recovery (ABR) at reset in the ordinary manner. Thus, diagnostic circuit 250a, 250b in any particular node 222a, 222b, ..., 222n can indicate to the node baseboard management controller 240a, 240b whether the node is a primary node or a secondary node and, based on that, whether or not it needs to activate ABR.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present invention may be embodied in whole or in part as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable and usable program code embodied in the medium.

Any combination of one or more computer usable or computer readable medium(s) may be utilized. The computer readable medium may be a computer readable signal medium or a computer readable storage medium. The computer-usable or computer-readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device, or any suitable combination of the foregoing. In the context of this document, a computer-usable or computer-readable storage medium may be any medium that can contain or store program code for use by or in connection with the instruction execution system, apparatus, or device.

A computer readable signal medium may include a propagated data signal with the computer-usable program code embodied therewith, either in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The foregoing disclosure includes flowchart illustrations and/or block diagrams of methods, apparatus (systems) and computer program products according to illustrative embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions also may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions also may be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters also may be coupled to the system to enable the data processing system to become coupled to other data processing systems or remote printers or storage devices through intervening private or public networks. Modems, cable modem and Ethernet cards are just a few of the currently available types of network adapters.

The foregoing disclosure has been presented for purposes of illustration and description, and is not intended to be exhaustive or to limit the invention to the form disclosed. Many modifications and variations will be apparent to those of ordinary skill in the art. The illustrative embodiments were chosen and described in order to best explain the principles of the invention, the practical application, and to enable others of ordinary skill in the art to understand the invention for various embodiments with various modifications as are suited to the particular use contemplated.

The terminology used herein is for the purpose of describing particular illustrative embodiments only and is not intended to be limiting. As used herein, the singular forms "a", "an" and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

What is claimed is:

1. A method for diagnosing a data processing system, the method comprising:
   responsive to an event to start the data processing system, providing diagnostic signals to a point along a code fetch chain prior to a processor retrieving startup code used to start up the data processing system, wherein the code fetch chain couples the processor to a startup memory storing the startup code; and detecting a problem in the code fetch chain from a response of the code fetch chain to the diagnostic signals.

2. The method of claim 1, wherein the providing step comprises:

providing diagnostic signals in sequence to a plurality of points along the code fetch chain prior to the processor retrieving startup code.

3. The method of claim 2, wherein the providing step comprises:

first providing a first diagnostic signal to the processor as a reset vector and then providing the diagnostic signals to the plurality of points along the code fetch chain in a sequence such that subsequent points in the sequence are further from the processor along the code fetch chain than previous points in the sequence.

4. The method of claim 1, wherein the providing step comprises:

providing the diagnostic signals from a diagnostic circuit coupled to a plurality of points along the code fetch chain.

5. The method of claim 4, wherein the detecting step comprises:

receiving by the diagnostic circuit a response signal from the code fetch chain in response to the diagnostic signals; and detecting by firmware in the diagnostic circuit any problem in the code fetch chain from the response signal.

6. The method of claim 1, wherein:

the processing system is a multinode data processing system;

responsive to an event to start the data processing system, for each of a plurality of server nodes in the data processing system, providing diagnostic signals to a point along a node code fetch chain prior to a node processor retrieving startup code used to start up the server node, detecting a problem in the node code fetch chain of the server node from a response of the node code fetch chain to the diagnostic signal, and responding to detection of a problem in the node code fetch chain by signaling a failure status for the server node to the other server nodes in the multinode data processing system, wherein the node code fetch chain couples the node processor to a node startup memory storing the startup code for the server node;

for a one of the plurality of server nodes designated as a primary node, when a problem in the code fetch chain of the primary node is not detected, determining within the primary node a failure status of the other nodes in the multinode data processing system and partitioning the server nodes in the multinode data processing system such that server nodes signaling a failure status are dropped from the system; and for another of the plurality of server nodes designated as a secondary node, when a problem in the code fetch chain of the secondary node is not detected and if a failure status is signaled for the primary node, determining within the secondary node a failure status of any other server nodes in the multinode data processing system and partitioning the server nodes in the multinode data processing system such that server nodes signaling a failure status are dropped from the system and the secondary node is made the primary node.

7. The method of claim 1, wherein:

the processing system is a multinode data processing system;

responsive to an event to start the data processing system, for at least one of a plurality of server nodes in the data processing system, providing diagnostic signals to a point along a node code fetch chain prior to a node processor retrieving startup code used to start up the server node and detecting a problem in the node code fetch chain of the server node from a response of the node code fetch chain to the diagnostic signals;

responding to detection of a problem in the node code fetch chain of the at least one server node by determining whether the problem in the node code fetch chain of the at least one server node can be overcome by coupling the node processor of the at least one server node to the node code fetch chain of another server node in the multinode data processing system; and when it is determined that the problem in the node code fetch chain can be overcome, coupling the node processor of the at least one server node to the node code fetch chain of another server node in the multinode data processing system.

8. An apparatus, comprising:

a diagnostic circuit adapted to be coupled to a code fetch chain in a data processing system, wherein the code fetch chain couples a processor to a startup memory storing startup code; and wherein the diagnostic circuit is adapted, responsive to an event to start the data processing system, to provide diagnostic signals to a point along the code fetch chain prior to the processor retrieving startup code from the startup memory, to receive a response signal from the code fetch chain in response to the diagnostic signal, and to detect a problem in the code fetch chain from the response signal.

9. The apparatus of claim 8, wherein:

the diagnostic circuit is adapted to be coupled to a plurality of points along the code fetch chain and is adapted to provide diagnostic signals in sequence to the plurality of points along the code fetch chain prior to the processor retrieving startup code from startup memory.

10. The apparatus of claim 9, wherein:

the diagnostic circuit is coupled to the processor and adapted to first provide a first diagnostic signal to the processor as a reset vector and then to provide the diagnostic signals to the plurality of points along the code fetch chain in a sequence such that subsequent points in the sequence are further from the processor along the code fetch chain than previous points in the sequence.

11. The apparatus of claim 8, wherein the diagnostic circuit includes a field programmable gate array.

12. The apparatus of claim 8, wherein the diagnostic circuit is coupled to the code fetch chain by a serial peripheral interface.

13. The apparatus of claim 8, wherein:

the diagnostic circuit is a node diagnostic circuit;

a node diagnostic circuit is provided in each of a plurality of server nodes in a multinode data processing system, wherein each node diagnostic circuit is coupled to a corresponding node code fetch chain and to other node diagnostic circuits, wherein each node code fetch chain couples a server node processor to a corresponding node startup memory storing node startup code;

wherein each diagnostic circuit is adapted, responsive to an event to start the multinode data processing system, to provide diagnostic signals to a point along the corresponding node code fetch chain, to receive a response signal from the node code fetch chain in response to the diagnostic signal, to detect a problem in the node code fetch chain from the response signal, and to respond to detection of a problem in the node code fetch chain of the server node by signaling a failure status for the node to other server nodes in the multinode data processing system;

wherein the diagnostic circuit in a one of the plurality of server nodes designated as the primary server node is further adapted to, when a problem in the node code fetch chain of the primary node is not detected, determine a failure status of the other nodes in the multinode data processing system and partition the server nodes in the multinode data processing system such that server nodes signaling a failure status are dropped from the system; and wherein the diagnostic circuit in another of the plurality of server nodes designated as a secondary node is further adapted to, when a problem in the code fetch chain of the secondary node is not detected and when the primary node signals a failure status, determine a failure status of the other nodes in the multinode data processing system and partition the server nodes in the multinode dataprocessing system such that server nodes signaling a failure status are dropped from the system and the secondary node is made the primary node.

14. The apparatus of claim 8, wherein:

the diagnostic circuit is a node diagnostic circuit provided in a first server node of a multinode data processing system, wherein the node diagnostic circuit is coupled to a corresponding first node code fetch chain that couples a first server node processor to a first corresponding node startup memory storing node startup code, and wherein the node diagnostic circuit is coupled to a second node code fetch chain in a second server node of the multinode data processing system that couples a second server node processor to a second corresponding node startup memory storing node startup code; and the diagnostic circuit is adapted, responsive to an event to start the multinode data processing system, to provide diagnostic signals to a point along the first corresponding node code fetch chain, to receive a response signal from the first node code fetch chain in response to the diagnostic signal, to detect a problem in the first node code fetch chain from the response signal, and to respond to detection of a problem in the first corresponding node code fetch chain by:

determining whether the problem in the first corresponding node code fetch chain of the first server node can be overcome by coupling the first node processor of the first server node to the second node code fetch chain of the second server node in the multinode data processing system; and when it is determined that the problem in the first node code fetch chain of the first server node can be overcome, coupling the first node processor of the first server node to the second node code fetch chain in the second server node of the multinode data processing system via the diagnostic circuit.

15. The apparatus of claim 14, wherein the node diagnostic circuit is coupled to the second node code fetch chain via a second node diagnostic circuit in the second server node of the multinode data processing system.

16. A storage medium having stored thereon code for controlling a diagnostic circuit to perform a method for diagnosing a data processing system, comprising:

responsive to an event to start the data processing system, providing diagnostic signals to a point along a code fetch chain prior to a processor retrieving startup code used to start up the data processing system, wherein the code fetch chain couples the processor to a startup memory storing the startup code; and detecting a problem in the code fetch chain from a response of the code fetch chain to the diagnostic signals.

17. The storage medium of claim 16, wherein the providing step comprises:

providing diagnostic signals in sequence to a plurality of points along the code fetch chain prior to the processor retrieving startup code.

18. The storage medium of claim 17, wherein the providing step comprises:

first providing a first diagnostic signal to the processor as a reset vector and then providing the diagnostic signals to the plurality of points along the code fetch chain in a sequence such that subsequent points in the sequence are further from the processor along the code fetch chain than previous points in the sequence.

19. The storage medium of claim 16, wherein the code for controlling the diagnostic circuit is firmware.

20. The storage medium of claim 16, wherein the storage medium is flash memory.

* * * * *